United States Patent
Importico

(10) Patent No.: US 7,422,144 B1
(45) Date of Patent: Sep. 9, 2008

(54) METHOD AND APPARATUS FOR RECYCLING IN A MULTI-FLOOR BUILDING

(76) Inventor: Michael Importico, 1611 Harbor Cove, Somers Point, NJ (US) 08244

( * ) Notice: Subject to any disclaimer, the term of this patent is extended or adjusted under 35 U.S.C. 154(b) by 0 days.

(21) Appl. No.: 11/836,595

(22) Filed: Aug. 9, 2007

(51) Int. Cl.
B65G 11/04 (2006.01)

(52) U.S. Cl. .................. 232/44; 232/43.2; 209/655; 193/31 R

(58) Field of Classification Search .......... 232/44, 232/43.1, 43.2, 43.3; 209/706, 655–657; 193/31 R, 31 A; 177/25.11
See application file for complete search history.

(56) References Cited

U.S. PATENT DOCUMENTS

| | | | |
|---|---|---|---|
| 5,000,641 A | 3/1991 | Kikuchi et al. | |
| 5,016,197 A | 5/1991 | Neumann et al. | |
| 5,031,829 A | 7/1991 | Shantzis | |
| 5,139,205 A | 8/1992 | Gallagher et al. | |
| 5,217,173 A | 6/1993 | Koenig | |
| 5,257,577 A * | 11/1993 | Clark ................... | 100/99 |
| 5,259,304 A | 11/1993 | Roberts | |
| 5,390,863 A | 2/1995 | Tondo | |
| 5,425,458 A * | 6/1995 | Gilcreest et al. ........... | 209/655 |
| 5,551,576 A | 9/1996 | Importico | |
| 5,619,914 A | 4/1997 | Pontarollo | |
| 5,695,115 A * | 12/1997 | Shantzis et al. ........... | 232/43.2 |
| 5,806,759 A * | 9/1998 | Axisa .................... | 232/44 |
| 5,950,920 A * | 9/1999 | Acosta ................... | 232/43.1 |
| 6,050,485 A * | 4/2000 | Brito .................... | 235/91 R |
| 6,588,330 B1 | 7/2003 | Importico | |

* cited by examiner

Primary Examiner—William L. Miller
(74) Attorney, Agent, or Firm—Caesar, Rivise, Bernstein, Cohen & Pokotilow, Ltd.

(57) ABSTRACT

A system to separate and store trash in a multi-floor building includes a waste chute with at least one intake door located on a floor of the building. A login device identifies a user and a selection device selects the type of trash to be discarded. A first receptacle and at least one additional receptacle are provided. A diverter assembly diverts trash placed into the chute to the first receptacle or one of the additional receptacles. A controller includes a selector for selecting the particular category of trash is connected to the diverter assembly. A scale is connected to each additional receptacle for measuring the weight in each additional receptacle. The system stores the weight of the recyclable material deposited in connection with the particular user. A computer system processes and stores data. A method of using the system is also provided.

2 Claims, 4 Drawing Sheets

METHOD AND APPARATUS FOR RECYCLING IN A MULTI-FLOOR BUILDING

BACKGROUND OF THE INVENTION

This invention relates generally to commercial trash compactors of the type usually found in apartment buildings. More particularly, this invention relates to trash compactors that allow a trash bin to be loaded and then uses a ram to compact the trash within the trash bin.

Collecting and transporting trash from urban areas has become a major industry throughout the civilized world. Because trash must be transported from urban areas to areas where it can be left in landfills or otherwise disposed of, an important function in transporting trash is to first compact it so as to reduce the volume required to transport a given weight of waste material. Trash compactors have been utilized in trash transfer stations where trash is brought by vehicles that collect it in urban areas and reprocessed and placed on larger vehicles for long haul transportation to remote landfills or other disposal locations.

This invention relates to a solid waste trash separation system for use in tall buildings to permit the tenants to dispose of their recyclable materials so that they are separated into various bulk receptacles in the building's basement, when the trash is placed into a trash chute located on each floor. The tenant controls the trash system which permits the trash to be delivered into different containers depending upon the type of trash.

State and local governments require that trash be separated and certain portions recycled when it is disposed of, e.g., paper, comingled recyclable materials and unrecyclable materials. If a tenant disposes of all trash into a single, typical trash chute found in many apartment buildings, that trash empties into a single basement trash dumpster and must then be separated by building management, an often time-consuming and unpleasant task.

U.S. Pat. No. 5,551,576 (Importico) addressed this issue by disclosing a system to separate and store trash which has been segregated into various categories for use in a multi-floor building. The system has a vertical waste chute with at least one access door to the chute located at each floor of the building. The chute has an upper and lower portion and two paths therethrough. The first path permits vertical disposal of the trash and the second path is angled to the first to permit designated trash to follow a different pathway for disposal. The system further includes a diverter located adjacent to the lower portion of the chute for diverting the path of the trash placed into the chute from a first location containing a plurality of trash receptacles located on a platform to a second location having at least one trash receptacle, such as a trash compactor. The system also includes a receptacle mover to move a selected trash receptacle beneath the chute to receive a particular category of trash deposited into the chute. A controller controls the receptacle mover and includes a selector to select the particular category of trash to be deposited into the access door and an indicator to indicate the category selected. The selector and indicator are located adjacent to each access door. The controller is operatively connected to the receptacle mover to selectively control the receptacle mover.

U.S. Pat. No. 6,588,330 (Importico) discloses a top loading trash compactor for compacting trash in a container, including a packing head that is preferably generally pie-shaped in cross section, rotatably mounted to a frame about the apex of the pie-shape. A power unit is provided for providing power to rotate the packing head, via a driver, from a first position to a second position, the first position allowing trash to enter the container and the second position causing the trash to be compacted within the container. The frame holds the apex of the packing head above the container.

U.S. Pat. No. 5,031,829 (Shantzis) shows a system which uses a single chute in a multi-story building to collect into separate receptacles, different categories of wastes already separated by the tenant for recycling. A turntable carries a large receptacle for each category of waste. Control means on each floor enable a tenant to operate the turntable to position a selected receptacle beneath the turntable to receive a particular category of waste. A microprocessor controller and interlocks on the access doors prevent conflicts between floors.

Additionally, in suburban areas, typically for private homes, a system by, for example, Recycle Bank of Philadelphia, Pa. supplies a recycling bin to each individual house. Each recycle bin is addressed with a bar code or RFID tag attached to it. The household customer places all of their combined recyclables (of all categories) into this one bin. The bin is then picked up and dumped by a recycling truck. The truck is equipped with a scale that weighs the material. The bar code of the bin is then scanned and the weight of that bin is recorded. The weight of recyclable material that the household accumulates is stored and then transferred into "recycling dollars." These recycling dollars are redeemed by the household on the bank website for store coupons.

Accordingly, a need exists for a recycling trash system that awards customers for recycling at multi-floor buildings, not houses. A difficulty to this point has been that, recycle bins have been, for the most part, located on each floor of the multi-floor buildings. If the bins are located in, for example, stair hallways, this may present a cleanliness or health problem and a fire hazard.

All references cited herein are incorporated herein by reference in their entireties.

BRIEF SUMMARY OF THE INVENTION

A system to separate and store trash for use in a multi-floor building is provided. The system includes a vertical waste chute with at least one trash intake door to the chute located on each floor of the building. The chute has an upper and lower portion and a path therethrough. A login device for identifying a user of the system that is about to put trash and or recyclable material into the waste chute and a selection device for use by the user to select the type of trash or recyclable material about to be discarded are provided on each floor adjacent to the chute. A first receptacle for trash and at least one additional receptacle (where each additional receptacle is for a different type of recyclable material) are also provided. The system further includes a diverter assembly associated with the selection device, located adjacent to the lower portion of the chute for diverting the path of the trash placed into the chute to the first receptacle or one of the additional receptacles. At least one controller is provided, which is located adjacent to each trash intake door. The controller includes a selector for selecting the particular category of trash to be deposited into the trash intake door and is operatively connected to the diverter assembly for selectively controlling the flow of trash into one of the trash receptacles. A first scale may be (but not necessarily) connected to the first receptacle for measuring the weight of trash in the first receptacle. A scale is connected to each additional receptacle for measuring the weight of recyclable materials in each additional receptacle. When recyclable materials are placed in the receptacle, the system stores the weight of the recyclable material in connection with the particular user. A computer system is connected to the scales connected to each additional receptacle to process and store data collected from the scales connected to each additional receptacle.

A method of rewarding users for discarding recyclable materials is also provided, where the users reside in a multi-floor building having a central location for the collection of trash and recyclable materials. The method includes the steps of providing a vertical waste chute with at least one trash intake door to the chute located on a floor of the building, the chute having an upper and lower portion and a first path therethrough, providing a first receptacle for trash, and providing at least one additional receptacle, each additional receptacle for a different type of recyclable material. The method continues with the steps of entering a user identification code into a login device for identifying a particular user of the system that is about to put waste into the waste chute, selecting a type of waste about to be discarded in the chute, disposing of waste by discarding the waste through the trash intake door into the waste chute, diverting the waste into to the first receptacle when a user selects trash, and diverting the waste into one of the at least one additional receptacles when the waste is recyclable material. Finally the method continues with the steps of measuring and recording the weight of the waste in each additional receptacle, processing the recorded weight of waste in each additional receptacle to create data correlating the user identification code with the weight of discarded waste in each of the at least one additional receptacles, summing up a gross total weight for each additional receptacle over the period of time for the particular user, and awarding the particular user based on the gross total weight for each additional receptacle over the period of time.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

The invention will be illustrated in more detail with reference to the following embodiments, but it should be understood that the present invention is not deemed to be limited thereto.

Figure 1:
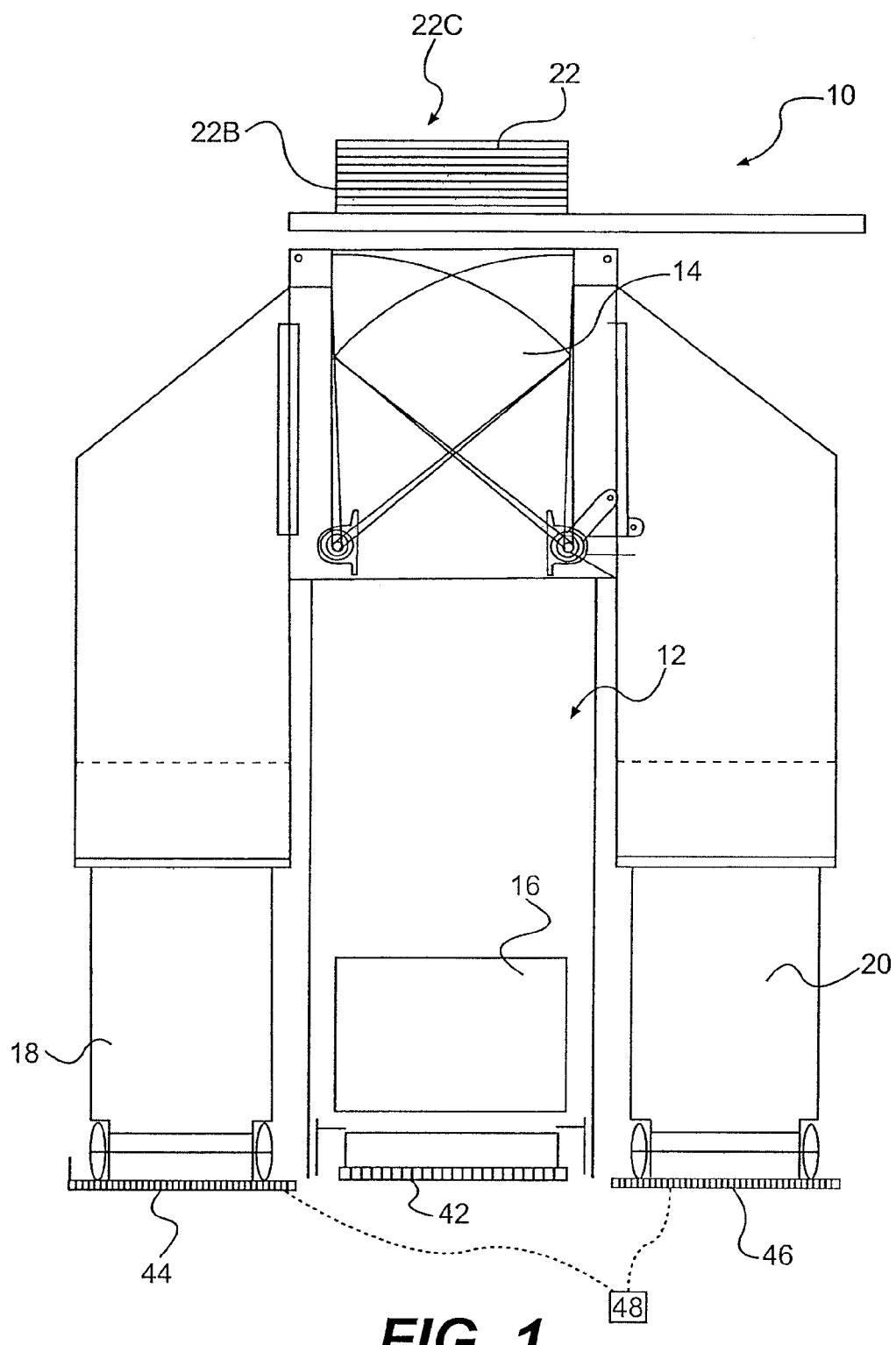
FIG. 1 is a simplified view of a compactor, diverter system and trash and recycle bins of a system to separate and store trash in accordance with a preferred embodiment of the present invention.

Referring now to the drawing figures, wherein like part numbers refer to like elements throughout the several views, there is shown in FIG. 1 a compactor 12, diverter system 14 and receptacle for trash 16 and recycle bins (paper receptacle 18, commingled recyclables receptacle 20) of a system to separate and store trash for use in a multi-story building 10 in accordance with a preferred embodiment of the present invention.

Figure 2:
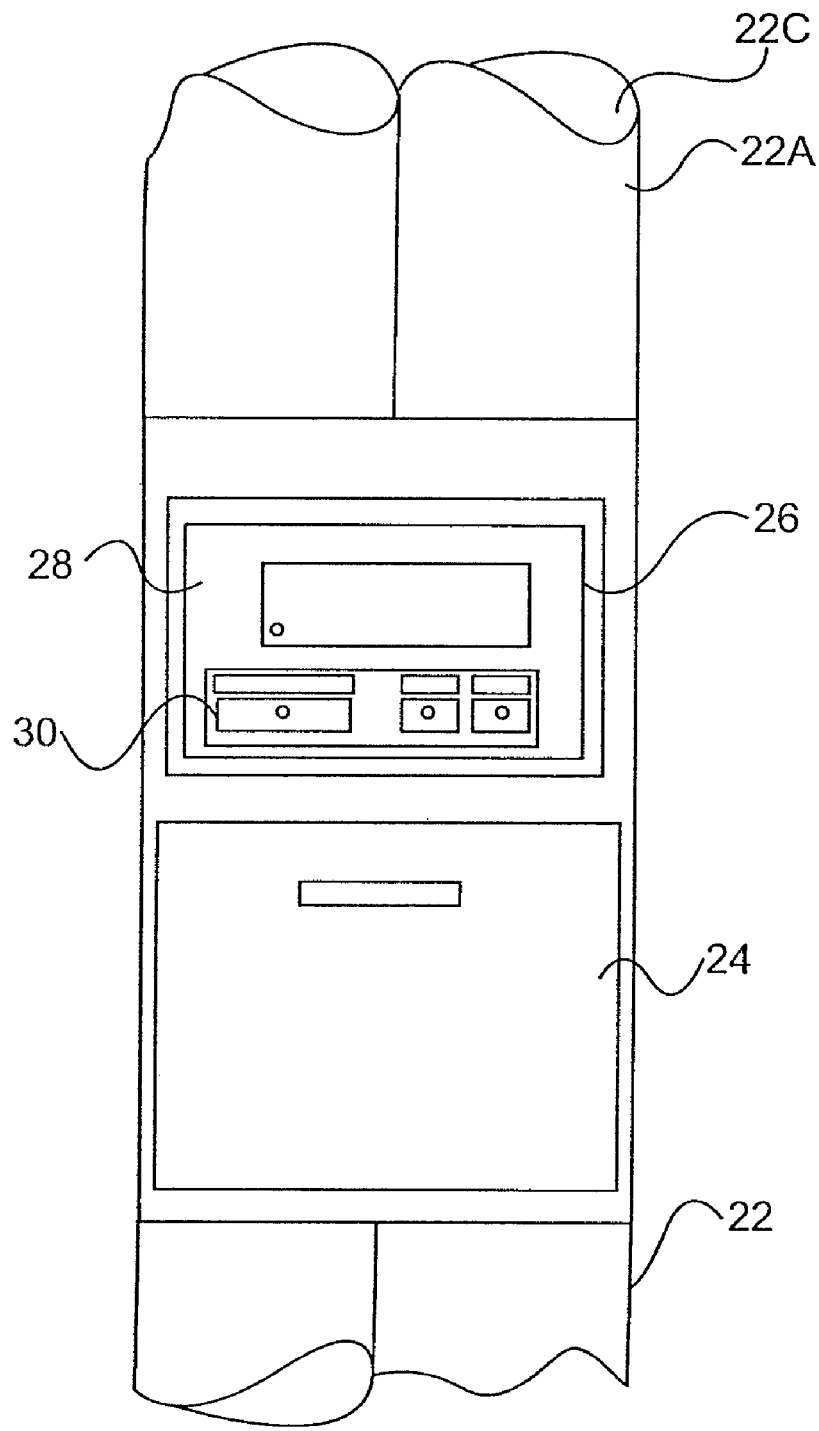
FIG. 2 is an access panel and trash shoot of the system to separate and store trash of FIG. 1.

As best seen in FIG. 2, the system 10 includes a vertical waste chute 22 with at least one trash intake door 24 to the chute 22 located on each floor of the building. The chute has an upper portion 22A, a lower portion 22B and a path 22C therethrough.

Figure 3:
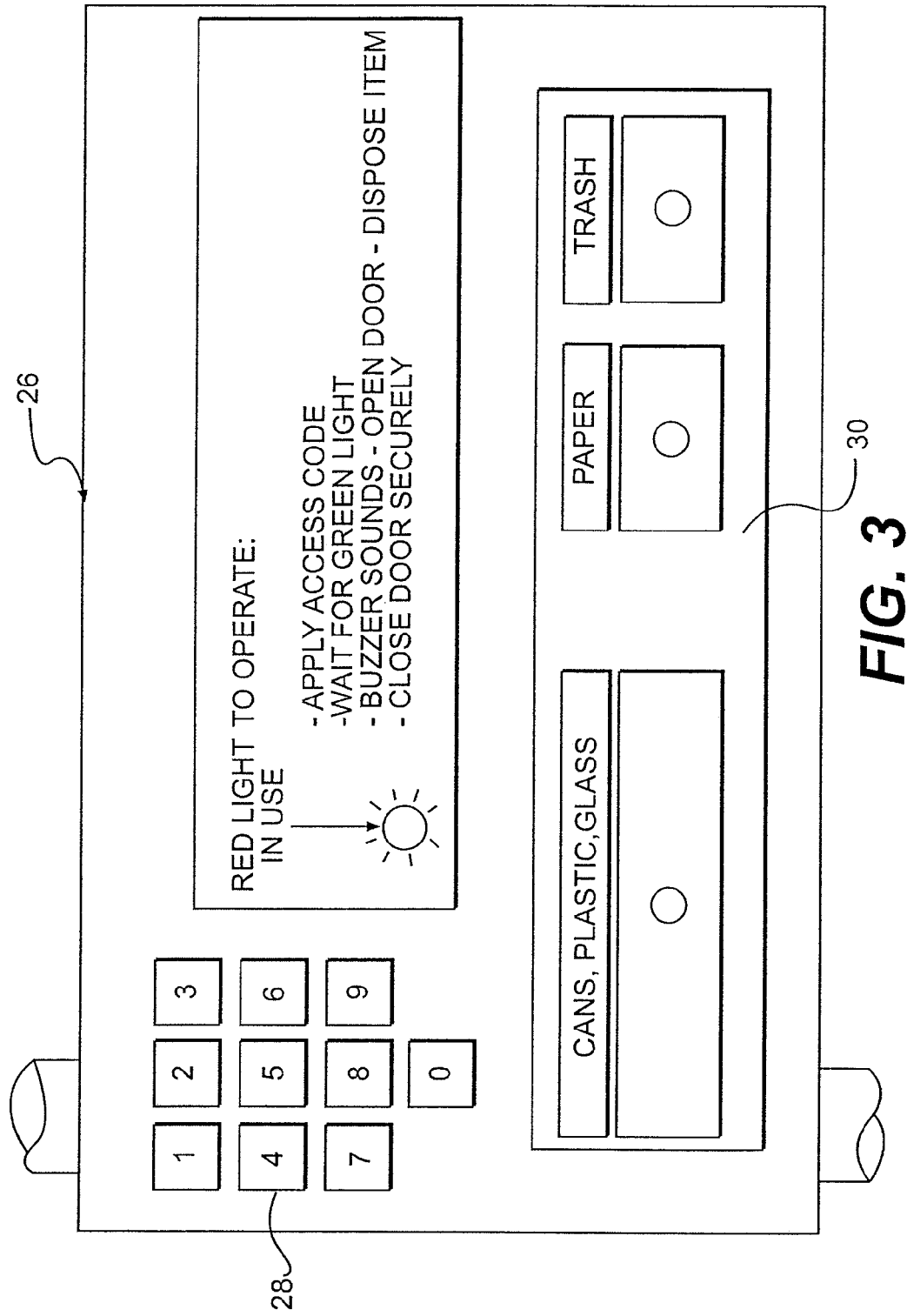
FIG. 3 is user access panel of the system to separate and store trash of FIG. 1.

As seen in FIG. 3, a controller 26 is provided that includes a login device having a keypad 28 for identifying a user of the system 10 that is about to put trash and or recyclable material (for example, paper or commingled recyclables) into the waste chute 22. The controller 26 includes a selection device, such as touch panel 30 for use by the user to select the type of trash or recyclable material about to be discarded. In this example, the user may select "Cans, Paper and Glass," "Paper," or "Trash." Such a system is taught for example, in U.S. Pat. No. 5,551,576 (Importico), the complete specification of which is hereby fully incorporated by reference in its entirety.

As seen in FIG. 1, the system includes a first receptacle for trash 16 and at least one additional receptacle (e.g., a paper recycle receptacle 18 and a commingled recycled receptacle 20). A diverter system 14 is included, located adjacent to the lower portion 22B of the chute 22 for diverting the path 22C of the trash placed into the chute 22 to one of the first receptacle 16 or one of the additional receptacles 18, 20.

A controller 26 is located adjacent to the trash intake door 24 on each floor. The controller 26 includes a touch panel 30 for selecting the particular category of trash to be deposited into the trash intake door 24. The controller 26 is operatively connected to the diverter system 14 for selectively controlling the flow of trash into one of the trash receptacles 16, 18, 20.

Optionally, a first scale 42 may be connected to the first receptacle 16 for measuring the weight of trash in the first receptacle 16. However, the present invention requires that an additional scale (e.g., scale for paper 44, scale for commingled recyclables 46) is connected to each additional receptacle 18, 20 for measuring the weight of recyclable materials in each additional receptacle 18, 20.

A computer system 48, connected to the scales 44, 46 that are connected to each additional receptacle 18, 20 is provided to process and store data collected from the scales 44, 46.

Figure 4:
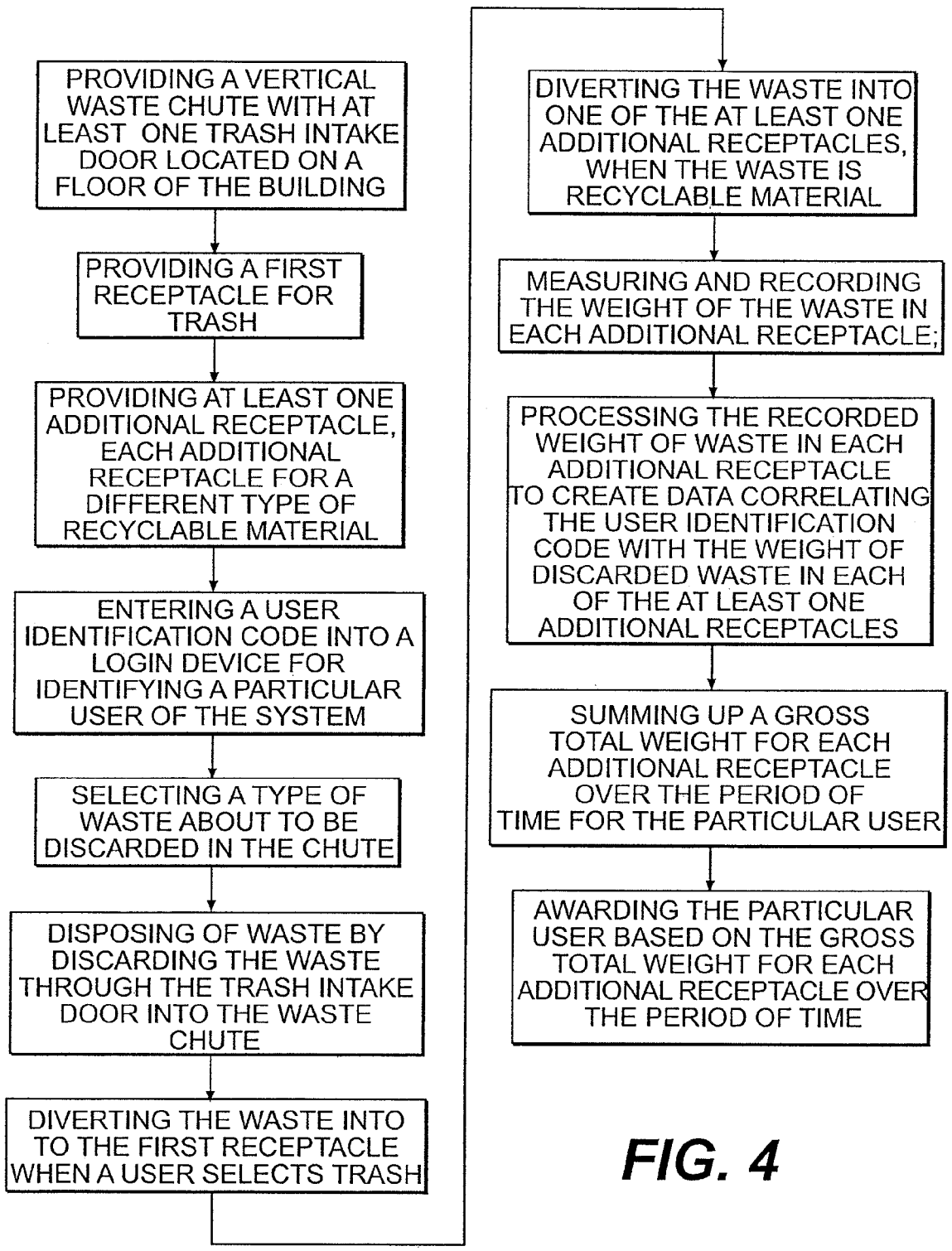
FIG. 4 is a flowchart of a method for using the system of FIGS. 1-3.

A method of rewarding users for discarding recyclable materials is also provided using the above described system 10, as shown in the flowchart of FIG. 4. The users reside in a multi-floor building having a central location for the collection of trash and recyclable materials. The method includes the steps of providing the system described above, entering a user identification code into the login device having a keypad 28 for identifying a particular user of the system 10 that is about to put waste into the waste chute 22, selecting a type of waste about to be discarded in the chute 22 using the touch panel 30, and disposing of waste by discarding the waste through the trash intake door 24 into the waste chute 22. The method continues with the steps of diverting the waste into to the first receptacle 16 when a user selects "Trash" on the touch panel 30, diverting the waste into one of the at least one additional receptacles 18, 20, when the waste is recyclable material, measuring and recording the weight of the waste in each additional receptacle 18, 20, processing the recorded weight of waste in each additional receptacle to create data correlating the user identification code with the weight of discarded waste in each of the at least one additional receptacles 18, 20, and summing up a gross total weight for each additional receptacle 18, 20 over the period of time for the particular user. Finally, a particular user is awarded an award based on the gross total weight for each additional receptacle 18, 20 over the period of time.

The benefits of the present invention include increased recycling, reduced disposal costs and reduced labor for building management and recycling authorities and/or watch groups.

While the invention has been described in detail and with reference to specific embodiments thereof, it will be apparent to one skilled in the art that various changes and modifications can be made therein without departing from the spirit and scope thereof.

What is claimed is:

1. A system to separate and store trash for use in a multi-floor building, the system comprising:
    (a) a vertical waste chute with at least one trash intake door to the chute located on a floor of the building, the chute having an upper and lower portion and a path therethrough;
    (b) a login device for identifying a user of the system that is about to put trash and or recyclable material into the waste chute;
    (c) a selection device for use by the user to select the type of trash or recyclable material about to be discarded;
    (d) a first receptacle for trash,
    (e) at least one additional receptacle, each additional receptacle for a different type of recyclable material,
    (f) a diverter system, associated with the selection device, located adjacent the lower portion of the chute for diverting the path of the trash placed into the chute to one of the first receptacle or one of the additional receptacles;
    (g) at least one controller, each controller adjacent the respective trash intake door, the controller including the selection device for selecting the particular category of trash to be deposited into the trash intake door and the login device, the controller operatively connected to the diverter system for selectively controlling flow of trash into one of the first receptacle for trash and the at least one additional receptacle;
    (h) a first scale connected to the first receptacle for measuring the weight of trash in the first receptacle;
    (i) a scale connected to each additional receptacle, for measuring the weight of recyclable materials in each additional receptacle; and
    (j) a computer system, connected to the scales connected to each additional receptacle, to process and store data collected from the scales connected to each additional receptacle.

2. A method of rewarding users for discarding recyclable materials, where the users reside in a multi-floor building having a central location for the collection of trash and recyclable materials, comprising the steps of:
    (a) providing a vertical waste chute with at least one trash intake door to the chute located on a floor of the building, the chute having an upper and lower portion and a first path therethrough;
    (b) providing a first receptacle for trash,
    (c) providing at least one additional receptacle, each additional receptacle for a different type of recyclable material;
    (d) entering a user identification code into a login device for identifying a particular user of the system that is about to put waste into the waste chute;
    (e) selecting a type of waste about to be discarded in the chute using a selection device;
    (f) disposing of waste by discarding the waste through the trash intake door into the waste chute;
    (g) diverting the waste into to the first receptacle when a user selects trash using a diverter system, wherein the diverter system diverts the path of the trash placed into the chute to one of the first receptacle or one of the additional receptacles;
    (h) diverting the waste into one of the at least one additional receptacles, when the waste is recyclable material, using the diverter system;
    (i) measuring and recording the weight of the waste in each additional receptacle using a scale connected to each additional receptacle;
    (j) processing the recorded weight of waste in each additional receptacle to create data correlating the user identification code with the weight of discarded waste in each of the at least one additional receptacles using a computer system,
    (k) summing up a gross total weight for each additional receptacle over the period of time for the particular user using the computer system; and
    (l) awarding an award to the particular user based on the gross total weight for each additional receptacle over the period of time.

* * * * *